United States Patent
Agrawal et al.

(10) Patent No.: US 9,417,854 B1
(45) Date of Patent: Aug. 16, 2016

(54) FUNCTIONAL USE-CASE GENERATION

(71) Applicant: Accenture Global Service Limited, Dublin (IE)

(72) Inventors: Nilesh Agrawal, Bangalore (IN); Vikrant Kaulgud, Pune (IN); Milind Savagaonkar, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/669,991

(22) Filed: Mar. 26, 2015

(51) Int. Cl.
*G06F 9/44* (2006.01)
*G06F 11/36* (2006.01)

(52) U.S. Cl.
CPC .............. *G06F 8/35* (2013.01); *G06F 11/3668* (2013.01)

(58) Field of Classification Search
None
See application file for complete search history.

(56) References Cited

U.S. PATENT DOCUMENTS

| | | |
|---|---|---|
| 7,346,888 B1 | 3/2008 | Srinivasan et al. |
| 8,707,250 B2 | 4/2014 | Kung |
| 8,924,991 B2 * | 12/2014 | Jin ...................... G06F 11/3636 717/125 |
| 2003/0055672 A1 | 3/2003 | Inoki et al. |
| 2005/0071810 A1* | 3/2005 | Sutter ..................... G06F 8/443 717/116 |
| 2006/0112122 A1 | 5/2006 | Goldszmidt et al. |
| 2009/0132562 A1 | 5/2009 | Mehr et al. |
| 2013/0097583 A1 | 4/2013 | Kung |

* cited by examiner

*Primary Examiner* — Chuck Kendall
(74) *Attorney, Agent, or Firm* — Mannava & Kang, P.C

(57) ABSTRACT

Functional use-case generation may include determining whether a requirements context is available. In response to a determination that the requirements context is available, the requirements context may be determined as a task context and as a rule context for a requirements sentence of a requirements document. The task context and the rule context may be used to select a functional model from a plurality of functional models. A functional use-case that includes an entity that is to perform a task based on a rule may be generated. Further, in response to a determination that the requirements context is not available, a functional model may be selected from the plurality of functional models based on process context, where the functional model includes a process related to the process context, and the functional model that includes the process related to the process context may be used to generate the functional use-case.

20 Claims, 20 Drawing Sheets

| Sno. | P&C Area - Name | MANDATORY INFORMATION | | Process Repository Reference URL |
|---|---|---|---|---|
| | | P&C Area - Description | Process Repository Reference ID | |
| 1 | Distribution | Insurance Area encompassing various aspects related to selling an insurance product | | |
| 2 | Hub | Hub contains the common processes used across the Lines of Enterprise | | |
| 3 | Service & Manfacturing | Insurance Area encompassing various aspects of quoting and servicing an insurance product | | |
| 4 | Enterprise | Insurance Area encompassing typical enterprise level functions of insurance providers | | |

FIG. 6A

| Sno. | Common Capability - Name | MANDATORY INFORMATION ||| Process Repository Reference URL |
|---|---|---|---|---|---|
| | | Common Capability - Description | Belongs to P&C Area | Process Repository Reference ID | |
| 1.1 | Distribution Channels | | Distribution | | |
| 1.2 | Interaction Channels | | Distribution | | |
| 1.3 | Marketing | | Distribution | | |
| 1.4 | Sales & Delivery | | Distribution | | |
| 2 | Hub | | Hub | | |
| 3.1 | Cross Capability | Insurance functions/capabilities which are common across various functional areas (e.g. UW, Pricing, Servicing, Claims) | Service & Manufacturing | | |
| 3.2 | Cross Product | | Service & Manufacturing | | |
| 4 | Enterprise | | Enterprise | | |

FIG. 6B

| Sno. | Functional Area Name | MANDATORY INFORMATION ||| Process Repository Reference ID | Process Repository Reference URL |
|---|---|---|---|---|---|---|
| | | Functional Area Description | Belongs to Level 2 | | | |
| 1.1.1 | Distribution Channels | | Distribution Channels | | | |
| 1.2.1 | Interaction Channels | | Interaction Channels | | | |
| 1.3.1 | Marketing | | Marketing | | | |
| 1.4.1 | Distribution Management | | Sales & Delivery | | | |
| 1.4.2 | Sales & Service Management | | Sales & Delivery | | | |
| 1.4.3 | Sales | | Sales & Delivery | | | |
| 1.4.4 | Channel Performance Management | | Sales & Delivery | | | |
| 2.1.1 | Hub | | Hub | | | |
| 3.1.1 | Cross-Capability | | Cross Capability | | | |
| 3.2.1 | Product Definition & Maintenance | | Cross Product | | | |
| 3.2.2 | Underwriting & Pricing | | Cross Product | | | |
| 3.2.3 | Policy Servicing | | Cross Product | | | |
| 3.2.4 | Claims | | Cross Product | | | |
| 4.1.1 | Enterprise | | Enterprise | | | |

FIG. 6C

MANDATORY INFORMATION

| Sno. | Process Name | Process Description | Belongs to Functional Area | Process Repository Reference ID | Process Repository Reference URL |
|---|---|---|---|---|---|
| 1.1.1.1 | Distribution Channels | Definition to be added | Distribution Channels | | |
| 1.2.1.1 | Interaction channels | Definition to be added | Interaction Channels, Interaction Channels | | |
| 1.3.1.1 | Enterprise Marketing Management | | Marketing | | |
| 1.3.1.2 | Customer Data Management | | Marketing | | |
| 1.3.1.3 | Customer & Market Insight | | Marketing | | |
| 1.3.1.4 | Market Segmentation & Positioning | | | | |
| 1.3.1.5 | Customer Experience Management | | Marketing | | |
| 1.3.1.6 | Loyalty Management | | Marketing | | |
| 1.3.1.7 | Customer Performance Management | | Marketing | | |
| 1.3.1.8 | Marketing Mix & Optimization | | Marketing | | |
| 1.3.1.9 | Brand Management | | Marketing | | |
| 1.4.1.1 | Establish Distribution Strategy & Organization | | Distribution Management | | |
| 1.4.1.2 | Build Channel / Producer Behavior, Insight & Segmentation | | Distribution Management | | |
| 1.4.1.3 | Initiative Development | | Distribution Management | | |
| 1.4.2.1 | Sales Planning & Forecasting | | Sales & Service Management | | |
| 1.4.2.2 | Sales Process Management | | Sales & Service Management | | |
| 1.4.2.3 | Pipeline Management | | | | |
| 1.4.2.4 | Territory Management | | Sales & Service Management | | |
| 1.4.2.5 | Service Delivery Management | | Sales & Service Management | | |
| 1.4.2.6 | Channel Governance | | Sales & Service Management | | |

FIG. 6D

| MANDATORY INFORMATION | | | |
|---|---|---|---|
| Sno. | LOB Name | LOB Description | Processes Implemented in the LOB |
| 1 | Auto | Auto Insurance | |
| 2 | Home | Homeowners Insurance | |

FIG. 6E

MANDATORY INFORMATION

| Sno. | SubProcess Name | SubProcess Description | Belongs to Process | Belongs to LOB | Pro. Rep. Ref. ID | Pro. Rep. Ref. URL |
|---|---|---|---|---|---|---|
| 1.1.1.1.1 | Determine Agent | Sub-process to determine the agent | Distribution Channels | Auto, Home | | |
| 1.1.1.1.2 | Create Agent | Create new agent in Agency System | Distribution Channels | Auto, Home | | |
| 1.1.1.1.3 | Maintain Agent | Maintain agent records in Agency System | Distribution Channels | Auto, Home | | |
| 1.1.1.1.4 | Update Agent | Update agent records | Distribution Channels | Auto, Home | | |
| 1.2.1.1.1 | Determine Access Method | Sub-process to determine various access points for an insurance company like web portal, kiosk, etc | Interaction channels | Auto, Home | | |
| 1.3.1.2.1 | Search for customer | Sub-process to search for customer in the existing master or client or CRM database | Customer Data Management | Auto, Home | | |
| 1.3.1.2.2 | Retrieve existing customer | Sub-process to retrieve customer information from the existing master or client or CRM database | Customer Data Management | Auto, Home | | |
| 1.3.1.2.3 | Determine New Customer | Sub-process to determine new customer if not already existing in master or client or CRM database | Customer Data Management | Auto, Home | | |
| 1.3.1.2.4 | Create new customer | This is the sub-process to register new customer if not already existing customer in the master or client or CRM database | Customer Data Management | Auto, Home | | |
| 1.3.1.2.5 | Create Customer Detail | This is the sub-process to capture new customer details | Customer Data Management | Auto, Home | | |
| 1.3.1.2.6 | Maintain Customer Detail | Maintain customer details in the customer database | Customer Data Management | Auto, Home | | |
| 1.3.1.2.7 | Determine Territory | Determine territory for the address entered | Customer Data Management, Territory Management | Auto, Home | | |
| 1.3.1.2.8 | Retrieve Customer Experience score | Sub process to Retrieve Customer Experience score through third party services/reports | Customer Data Management | Auto, Home | | |

FIG. 6F

| | | BASIC INFORMATION - MANDATORY | | | DETAILED INFORMATION - CAN BE FILLED IN THE GUI MODELER TOOL | |
|---|---|---|---|---|---|---|
| | | TERMS DESCRIPTION | | | ADDITIONAL ENTITY INFORMATION and ATTRIBUTES | |
| Sno. | Terms | Term Type | Term Description | | Known Aliases | | |
| 1 | Test Entity 1 | GenericEntity | Represents a generic concept in the domain | Belongs to Sub Process | Dummy generic | Type of Entity (use to capture "type of" relations - Test Entity 2 is type of Test Entity 1); Type of Entity (use to capture "type of" relations - Test Entity 2 is type of Test Entity 1) | Is Attribute of Entity (use to associate "attributes to entities") Test Entity 3 |
| 2 | Test Entity 2 | PersonEntity | Represents a human resource that participates in the domain. It is a "type of" Test Entity 1 | Test Sub Process | Dummy specific type | Test Entity 1 | |
| 3 | Test Entity 3 | DataEntity | Captures data. Data is associated with Test Entity 1 | Test Sub Process | Dummy data | | |
| 4 | Test Attribute 1 | Attribute | Is an attribute of the "data entity" Test Entity 2 | Test Sub Process | Dummy attribute | | Test Entity 3 |
| 5 | Test Entity 4 | SystemEntity | Sample entity | Test Sub Process, Test SubProcess 2 | Dummy entity 2 | Test Entity 1 | |
| 6 | User | PersonEntity | User of the system. The user can be customer, agent, underwriter or any other stakeholder in the process | Determine Agent , Search for customer, Retrieve existing customer, Create new customer | Business User, End user, System User, System operator | | Agent, Customer, Customer Detail, Underwriting Authority |

FIG. 6G

| | BASIC TASK MODEL | | | | | TASK IDENTIFIER | | | DETAILED INFORMATION - CAN BE FILLED IN THE GUI MODELER TOOL | | |
|---|---|---|---|---|---|---|---|---|---|---|---|
| | TASK DESCRIPTION | | | | | | | | | ADDITIONAL INFORMATION | |
| Sno. | Collection | Task(action) | Known Aliases | Belongs to sub process | Action | Actor | Acted upon object | Other involved entities | Task Type | Task Initiation | Sample Requirements |
| 1 | Capture Risk Location Zip/Postal code | Ability to modify homeowner risk location address information | | Capture Risk Location address | Modify | User | Risk Location | | Primary | UserTriggered | Ability to maintain risk location address information |
| 2 | Capture Risk Location Zip/Postal code | Ability to capture homeowner risk location address information | | Capture Risk Location address | Capture | User | Risk Location | | Primary | UserTriggered | Ability to maintain risk location address information |
| 3 | Capture Risk Location Zip/Postal code | Ability to view homeowners risk location address information | | Capture Risk Location address | View | User | Risk Location | | Primary | UserTriggered | Ability to maintain risk location address information |
| 4 | Capture Risk Location Zip/Postal code | Ability to view consumer report notification information | | Capture Risk Location address | View | User | Risk Location | | Primary | UserTriggered | Ability to maintain consumer report notification information |
| 5 | Capture Risk Location Zip/Postal code | Ability to capture Do Not Share preference information | | Capture Risk Location address | Capture | User | Risk Location | | Primary | UserTriggered | Ability to maintain do not share preference information |
| 6 | Capture Risk Location Zip/Postal code | Ability to pre-populate city from zip/postal code | | Capture Risk Location address | Pre-Populate | System | Risk Location | | Primary | SystemTriggered | Ability to maintain do not share preference information |
| 7 | Capture Risk Location Zip/Postal code | Ability to pre-populate state/postal abbreviation from zip/postal code | | Capture Risk Location address | Pre-Populate | System | Risk Location | | Primary | SystemTriggered | Ability to maintain do not share preference information |
| 8 | Capture Risk Location Zip/Postal code | Ability to pre-populate risk location address information from customer record | | Capture Risk Location address | Pre-Populate | System | Risk Location | | Primary | SystemTriggered | Ability to maintain do not share preference information |
| 9 | Capture Risk Location Zip/Postal code | Ability to capture Business Events | | Create Content | Capture | System | Risk Location | | Primary | UserTriggered | Ability to maintain Business Event |

FIG. 6H

FUNCTIONAL USE-CASE GENERATION

BACKGROUND

A functional use-case may identify the actors, actions, and rules that cohesively form a unit of implementation. An actor may include, for example, a person, a company or organization, a computer program, a computer system, and/or time. Actions may be generally described as any acts that are performed by or on behalf of an actor. Further, rules may be generally described as any regulation or principle related to the actor and/or the action.

BRIEF DESCRIPTION OF DRAWINGS

Features of the present disclosure are illustrated by way of examples shown in the following figures. In the following figures, like numerals indicate like elements, in which:

FIGS. 6A-6H illustrate various components of a functional model, according to an example of the present disclosure;

DETAILED DESCRIPTION

Figure 1:
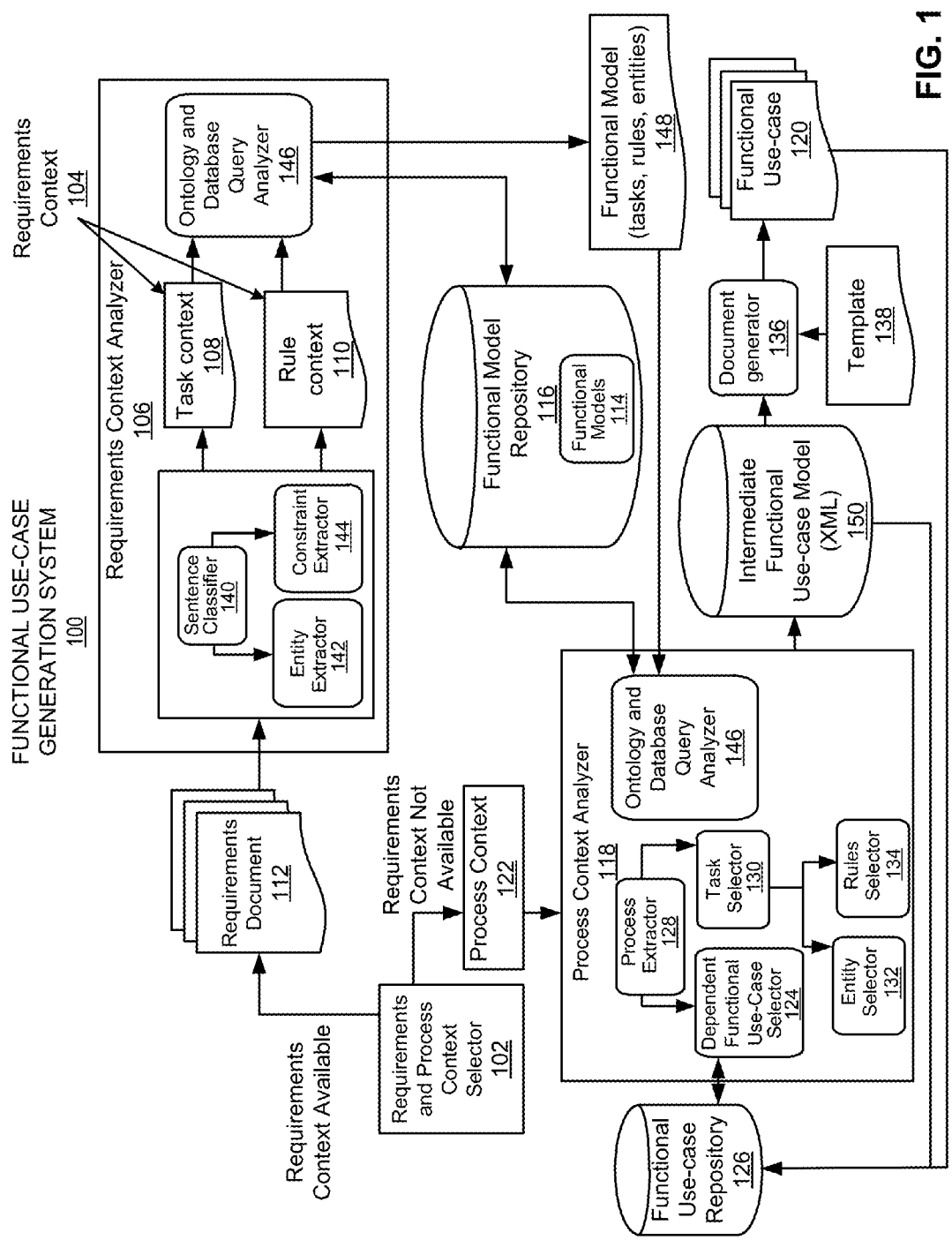
FIG. 1 illustrates a detailed architecture of a functional use-case generation system, including a high-level processing flow for the functional use-case generation system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A functional use-case may identify the actors, actions, and rules that cohesively form a unit of implementation. The functional use-case may be generated by an analyst as part of requirements engineering and initial software (i.e., machine readable instructions) design activities by using, for example, experiential knowledge, interaction with entities that are involved in a particular functional use-case, other similar functional use-cases, and/or a requirements document.

A requirements document may specify the overall requirements that are needed to implement the functional use-case. That is, the requirements document may specify the nature and scope of a system-to-be-built. For example, a requirements document may specify that a "customer should be able to add an additional driver to the automobile quote". The functional use-case may be documented, for example, in a WORD or EXCEL format, or other similar formats.

Deficiencies in the requirements document may lead to incomplete and/or inaccurate functional use-case specification, which may lead to defects and higher cost of rework with respect to a particular requirements engineering and/or initial software design related activity. For example, since the requirements document is used for downstream activities related to software design, coding, and testing, any deficiencies in the requirements document may lead to inaccuracies with respect to the software design, coding, and testing.

For example, as part of requirements engineering, an analyst may first identify, in a requirements document, the requirements that need to be addressed to implement a project, and secondly, convert the requirements to a functional use-case. The requirements document typically does not include any information related to the actors that are involved, the start and/or end points of a project, and/or the sequence of steps that need to be implemented. Instead the functional use-case may identify the actors that are involved, the start and/or end points of a project, and/or the sequence of steps that need to be implemented.

Typically the functional use-case is generated based on rules that are related to the requirements specified in the requirements document. However, if a rule that is to be used to generate the functional use-case is incorrectly omitted, and/or if assumptions that are made during generation of the functional use-case are incorrect, then the functional use-case that is generated may include inaccuracies. For example, with respect to the requirements for a quote generation portal for online quote generation that is to be used by potential customers to generate quotes for an automobile purchase, a rule may specify that the age of a customer has to be greater than a specified age (e.g., sixteen eighteen years old) for the customer to be able to generate a purchase quote. Since such a rule related to a customer's age may be widely known in the automobile industry, the requirements for the quote generation portal may not explicitly specify the rule. When a functional use-case is generated for the quote generation portal, the functional use-case may not specify the customer age requirement. During development of the quote generation portal that is based on the functional use-case, the customer age requirement may not be implemented into the quote generation portal. The resulting quote generation portal may therefore include inaccuracies with respect to quote generation since the customer age requirement is not implemented.

In order to address at least the aforementioned aspects related to functional use-cases, according to examples described herein, a functional use-case generation system and a method for functional use-case generation are disclosed herein. The system and method disclosed herein may generally include a functional model repository that is used to augment the knowledge in a requirements document to increase the completeness of functional use-cases that are generated. The functional model repository may include knowledge represented in well-defined atomic constructs such as entities, tasks, and rules. The traceability across these constructs may facilitate the location of the correct knowledge, and reuse of the knowledge to define functional use-cases. For the functional model repository, entities may be described as actors or any element that may perform the functionality of an actor. Tasks may be described as any actions that are to be performed by an entity. Rules may be described as any regulation or principle related to the entity and/or the task.

The system and method disclosed herein may include a requirements context analyzer that is to extract context from a requirements document, and search the functional model repository for related best practices. The best practices may represent captured knowledge in terms of precise entities and their attributes, tasks, and related rules. For example, a requirements document may include a requirement that indicates "customer should be able to add an additional driver to the purchase quote". The requirements context analyzer may extract features from the requirement sentence (e.g., subject=customer, object=additional driver, action=add, additional object=purchase quote"). The features may generally represent a subject, an action, and/or an object related to a requirement sentence. Based on the extracted features, an ontology and database query analyzer may map the requirement specified in the requirements document to a process, task, and rule in the functional model repository. The mapping may form the context for a requirement (i.e., the requirement belongs to a particular process, the requirement may be associated with other tasks, the requirement may include rules associated with a task etc.).

The functional model repository may also be searched based on process context that is entered, for example, via a graphical user interface (GUI) for a process context analyzer to directly search the functional model repository for best practices. With respect to process context, if requirement context is not available (e.g., from a requirements document), then process context may be used to search the functional model repository. For example, a process context may be used by an analyst to express an intent (e.g., "I want to create a functional use-case based on tasks and rules in a new online quote process"). Based on the process context, the process context analyzer may extract the relevant information from the functional model repository, and provide the relevant information to a user for further refinement and functional use-case documentation.

The context from the requirements document, and/or the process context, and the functional model repository may be used to generate a functional use-case.

The system and method disclosed herein may provide an interface for the requirements context analyzer and the process context analyzer to guide a user (e.g., an analysts) with respect to generation of a functional use-case by providing information that the user may complete. The interface for the requirements context analyzer and the process context analyzer may provide contextual information to guide the user with respect to generation of the functional use-case.

The functional use-case generation system and the method for functional use-case generation disclosed herein provide a technical solution to technical problems related, for example, to functional use-case generation. The system and method disclosed herein provide the technical solution of a hardware implemented requirements and process context selector that is executed by at least one hardware processor to determine whether a requirements context is available. In response to a determination that the requirements context is available, a hardware implemented requirements context analyzer may determine the requirements context as a task context and as a rule context for a requirements sentence of a requirements document, utilize the task context and the rule context to select a functional model from a plurality of functional models, and utilize a hardware implemented process context analyzer to generate a functional use-case that includes an entity that is to perform a task based on a rule. Further, in response to a determination that the requirements context is not available, the hardware implemented process context analyzer may select, based on process context, a functional model from the plurality of functional models that includes a process related to the process context, and utilize the functional model that includes the process related to the process context to generate the functional use-case. The system and method disclosed herein further provide the technical solution of increased accuracy and efficiency of functional use-case generation, for example, based on the objective use of functional models that are used to generate the functional use-case. The objective use of functional models to generate the functional use-case may also provide for the technical solution of reduced resource utilization with respect to functional use-case generation.

FIG. 1 illustrates a detailed architecture of a functional use-case generation system 100, and a high-level processing flow for the system 100, according to an example of the present disclosure. The system 100 may include a hardware implemented requirements and process context selector 102 that is executed by at least one hardware processor (see FIG. 9), to determine whether a requirements context 104 is available.

In response to a determination that the requirements context 104 is available, a hardware implemented requirements context analyzer 106 may determine the requirements context 104 as a task context 108 and as a rule context 110 for a requirements sentence of a requirements document 112. The requirements context analyzer 106 may utilize the task context 108 and the rule context 110 to select a functional model 148 from a plurality of functional models 114. The functional models 114 may be stored in a functional model repository 116. The functional models 114 may be based on entities, tasks, and rules. Further, the requirements context analyzer 106 may utilize a hardware implemented process context analyzer 118 to generate a functional use-case 120 that includes an entity that is to perform a task based on a rule.

In response to a determination that the requirements context 104 is not available, the process context analyzer 118 may select, based on process context 122, a functional model from the plurality of functional models 114 that includes a process related to the process context 122. The process context analyzer 118 may utilize the functional model that includes the process related to the process context 122 to generate the functional use-case 120.

A hardware implemented dependent functional use-case selector 124 may select a functional use-case from a plurality of functional use-cases that may be stored in a functional use-case repository 126. The dependent functional use-case selector 124 may use information from the selected functional use-case to augment the entity, the task, and/or the rule related to the functional use-case 120 that is to be generated.

A hardware implemented process extractor 128 may determine a process scope of the process context 122, and utilize the process scope to determine the functional model from the plurality of functional models 114 that includes the process related to the process context 122.

A hardware implemented task selector 130 may select tasks based on the process scope to generate the functional use-case 120.

A hardware implemented entity selector 132 may select entities based on the selected tasks to generate the functional use-case 120. Further, a hardware implemented rules selector 134 may select rules based on the selected tasks to generate the functional use-case 120.

A hardware implemented document generator 136 may generate the functional use-case 120 based on a functional use-case template 138.

The hardware implemented requirements context analyzer 106 may utilize a hardware implemented sentence classifier 140 to classify the requirements sentence as a task or as a rule. Further, the sentence classifier 140 may determine the task context 108 and the rule context 110 based on the classification of the requirements sentence as the task or as the rule.

For a sentence classified as the task, the hardware implemented requirements context analyzer 106 may utilize a hardware implemented entity extractor 142 to determine the entity related to the task. Further, for the sentence classified as the rule, the hardware implemented requirements context analyzer 106 may utilize a hardware implemented constraint extractor 144 to determine an attribute related to the rule.

The hardware implemented requirements context analyzer 106 may utilize a hardware implemented ontology and database query analyzer 146 to utilize the task context 108 and the rule context 110 to determine related entities and rules to generate the functional use-case 120.

As described herein, the elements of the functional use-case generation system 100 may be machine readable instructions stored on a non-transitory computer readable medium. In addition, or alternatively, the elements of the functional use-case generation system 100 may be hardware or a combination of machine readable instructions and hardware.

Referring to FIG. 1, the functional model repository 116 may be used to store the functional models 114 that are used to generate the functional use-case 120. The functional models 114 may be described as process definition and orchestration captured in a structured manner. The functional models 114 may be used for requirements engineering applications. This allows for capture of functional knowledge in a form that may directly be used in requirements engineering activities. The functional models 114 may represent the functional knowledge that is captured over an extended period of time, for example, from previous functional use-cases and/or from user input with respect to the functional models 114. The functional models 114 may be described as a meta model, where the meta model may be instantiated for a particular domain (e.g., retail, telecom, insurance, etc.). The functional models 114 may be used to augment the requirements context 104 that is available from the requirements document 112 and/or the process context 122 that is entered by a user to generate the functional use-case 120.

The functional use-case 120 may be stored in the functional use-case repository 126. The functional use-case repository 126 may be a structured repository that captures the features of a functional use-case. For example, with respect to a quote generation portal for online quote generation that is to be used by potential customers to generate quotes for automobiles, a functional use-case (or certain parts of a functional use-case) that is generated with respect to the quote generation portal may be reused for other functional use-cases that include activities that are similar to those of the functional use-case being reused.

With respect to the flow of FIG. 1, the requirements and process context selector 102 may determine whether a requirements context 104 is available. For example, if the requirements document 112 is available or otherwise provided to the system 100, the requirements and process context selector 102 may determine that the requirements context 104 is available. As described in further detail herein, the requirements context analyzer 106 may thus extract the requirements context 104 from the requirements document 112. In this case, the requirements context analyzer 106 may search the functional model repository 116 based on the requirements context 104 to determine related best practices to generate the functional use-case 120.

If a requirements document 112 is not available and a process context 122 is entered (e.g., by a user), the requirements and process context selector 102 may determine that the requirements context 104 is not available. In this case, as described in further detail herein, the process context analyzer 118 may search the functional model repository 116 based on the process context 122 that is entered, for example, via a GUI to directly search the functional model repository 116 for best practices. If functional use-cases are available in the functional use-case repository 126, the functional model repository 116 and the functional use-case repository 126 may be searched by the process context analyzer 118 for best practices to generate the functional use-case 120.

With reference to FIG. 1, the process context analyzer 118 is described.

At the GUI for the requirements and process context selector 102, assuming that requirements context 104 is not available (i.e., the requirements and process context selector 102 determines that the requirements context 104 is not available), the ontology and database query analyzer 146 of the process context analyzer 118 may query the functional model repository 116 with respect to the process context 122 that is entered for process extractor 128. For example, for the functional model repository 116 that includes several functional models, where each function model may include several processes, several related tasks, and several related rules, the process extractor 128 may be used to narrow the scope of processes that are evaluated with respect to the process context 122. The process extractor 128 may narrow the scope of processes that are evaluated with respect to the process context 122 by defining a process scope relative to the process context 122. Thus, by narrowing the scope of the processes that are evaluated from the functional model repository 116, the process extractor 128 may narrow the scope of the tasks and related rules that are evaluated to generate the functional use-case 120.

Based on the use of the process extractor 128 to define the process scope, the task selector 130 may select tasks for the identified process scope. For example, with respect to selection of tasks from the identified process scope, for the high-level model 300 for the system 100 described herein with reference to FIG. 3, the system 100 may query the instantiated model, and extract related scoped tasks and rules. The tasks that are selected may represent the activities that are performed in the functional use-case 120. For example, with respect to the example of the quote generation portal for online quote generation that is to be used by potential customers to generate quotes for automobile purchase, activities may include logging into the portal, entering general customer profile data (e.g., name, age, address, etc.), etc. The task selector 130 may select the tasks that are related to a particular process based on the process extractor 128. With respect to selection of tasks that are related to a particular process based on the process scoping, for the high-level model 300 for the system 100 described herein with reference to FIG. 3, the system 100 may query the instantiated model and extract related scoped tasks and rules. Further, the tasks may be selected in an appropriate sequence related to task performance. For each of the selected tasks, the entities that are participating with respect to a task and the rules that are being applied may be respectively selected by the entity selector 132 and the rules selector 134 from the functional model repository 116. Thus, the process context analyzer 118 may determine the process scope, related tasks, related entities, and related rules from the functional model repository 116.

The dependent functional use-case selector 124 of the process context analyzer 118 may query the functional use-case repository 126 to determine if there are any related functional use-cases that may be used to generate the functional use-case 120. Based on the determination that there are related functional use-cases that may be used to generate the functional use-case 120, information from the related functional use-cases may be used to generate the functional use-case 120. With respect to use of information from the related functional use-cases, when a user of the system 100 creates the functional use-case 120, the functional use-case 120 may be stored in the functional use-case repository 126, and these functional use-cases from functional use-case repository 126 may be shown to the user while creating a new functional use-case.

The process context analyzer 118 may generate an intermediate functional use-case model 150 (e.g., an intermediate XML model for the functional use-case 120), and forward the intermediate functional use-case model 150 to a document generator 136. The document generator 136 may utilize the functional use-case template 138 to generate the functional use-case 120. The functional use-case 120 that is generated may be stored in the functional use-case repository 126.

With reference to FIG. 1, the requirements context analyzer 106 is described.

At the GUI for the requirements context analyzer 106, assuming that the requirements context 104 is available based on the requirements document 112 that is entered or selected, with respect to the requirements document 112, the sentence classifier 140 of the requirements context analyzer 106 may processor each sentence of the requirements document 112. Generally, the sentence classifier 140 may classify each sentence as a task or as a rule. For compound sentences, the sentence classifier 140 may fragment the sentence, and classify each sentence fragment of the sentence as a task or as a rule. If the sentence (or sentence fragment) is classified as a task, then the entity extractor 142 may determine the entity (e.g., actor) for the task. If the sentence (or sentence fragment) is classified as a rule, then the constraint extractor 144 may determine the attributes of the rule.

Determination of the task context 108 and rule context 110 is described.

With respect to sentence classification, the sentence classifier 140 may initially classify each sentence of the requirements document 112 as a fact (a definition fact or an enablement fact) or as a rule (i.e., a structural rule or an operative rule). With respect to facts and tasks, an enablement fact may be described as a task in the functional model.

With respect to the sentence classifier 140, a structural rule may constrain the structural components of entities. For example, a structural rule may indicate that "the same rental car is never owned by more than one branch". This example describes how the relationship of an entity "rental car" with another entity "branch" is constrained using the cardinality of one/one-to-one relationship between these two entities. An operative rule may constraint the behavior of an activity performed. For example, an operative rule may indicate that "a rental may be open only if an estimated rental charge is made."

With respect to the sentence classifier 140, generally, a fact may be described as a proposition that is taken to be true. A definition fact may explain or define a fact. For example, a definition fact may indicate that "the links button takes the user to a list of related web sites." An enablement fact may provide an ability to a user of a system. For example, an enablement fact may indicate that "the user may click on any column heading to sort the list by that column." With respect to definition facts and enablement facts, based on the type of fact, the sentence structure may change, and hence the appropriate heuristics may be used to parse different types of sentences, and extract relevant features.

With respect to sentence fragmentation, a sentence may include a main subject, an action, and an object. A sentence may also include sentence fragments that are combined by conjunctions (e.g., and, or, etc.) and include subordinate clauses. A subordinate clause (i.e., a dependent clause) may begin with a subordinate conjunction or a relative pronoun, and include both a subject and a verb. This combination of words may not form a complete sentence. Sentence fragmentation may be used to divide a sentence based on the subordinate clauses. The parse string of a sentence containing a subordinate clause may include a node with a SBAR tag, which is used to extract the main phrase and the subordinating clause. The SBAR tag may be introduced by a (possibly empty) subordinating conjunction or a dependent phrase. For example, for a sentence "even though the broccoli was covered in cheddar cheese, Emily refused to eat it," "even though the broccoli was covered in cheddar cheese" may be designated as a subordinating clause, and "Emily refused to eat it" may be designated as a main clause. A natural language parser may generate an output as follows:

```
(ROOT
    (S
        (SBAR (RB even) (IN though)
            (S
                (NP (DT the) (NN broccoli))
                (VP (VBD was)
                    (VP (VBN covered)
                        (PP (IN in)
                            (NP (NN cheddar) (NN cheese)))))))
        (, ,)
        (NP (NNP Emily))
        (VP (VBD refused)
            (S
                (VP (TO to)
                    (VP (VB eat)
                        (NP (PRP it))))))
        (. .)))
```

SBAR may be described as the clause introduced by a (possibly empty) subordinating conjunction.

The sentence classifier 140 may also simplify sentences, for example, by removing conjunctions such as "or" and "and", and dividing a sentence into a plurality of sentence fragments.

With respect to sentence fragment classification, if there is no constraint in the sentence fragment and the sentence fragment includes a definition phrase, the sentence fragment may be identified as a definition fact. Otherwise, if there is no constraint in the sentence fragment, and the sentence fragment does not include a definition phrase, then the sentence fragment may be identified as an enablement fact.

With respect to rule classification, a rule may be classified as a comparison rule, where two attributes are compared. An example of a comparison rule may include "if the number of years NCD is not greater than the number of years driving license held."

A rule may be classified as a logical value rule (i.e., an attribute is true or false). An example of a logical value rule may include "if previous quote is true on declarations object for the quote then."

A rule may be classified as an attribute existence rule that is based on the existence of an attribute. An example of an attribute existence rule may include "if the vehicle record exists for the quote."

A rule may be classified as an attribute change rule that is based on the modification of an attribute. An example of an attribute change rule may include "if any rating related information is changed on the quote then."

A rule may be classified as an attribute type rule based on a determination of whether an entity is a type of another entity. An example of an attribute type rule may include "if the additional driver is a student."

A rule may be classified as a dependent action performed rule based on a determination of whether a particular task is performed. An example of a dependent action performed rule may include "when the customer finishes updating the vehicle details.

With respect to the sentence classifier 140, subject, predicate, and object (SPO) extraction may be performed to map a sentence (i.e., a simple sentence) or a sentence fragment to a task in the functional model repository 116. For example, with respect to natural language that may be inherently considered imprecise, a requirement writer for the requirements document 112 may use natural language to express concepts in the requirements document 112 differently than the way concepts are captured in a formal functional model. The requirement writer may use words that are different than those present in a functional model but are conceptually similar. Alternatively or additionally, the requirement writer may use a different order of words in a phrase. For example, the entity "customer" may be expressed as "client"; the attribute of "customer" (e.g., first name) may be expressed as "name of client" or "customer's name", etc. In order to address these alternatives, lexical as well as semantic similarity measures may be combined to map the extracted terms to the functional model elements. A matching score of the terms extracted from the natural language requirements with the candidate functional model elements may be determined, and the functional model element with the highest matching score may be selected. Given a sentence or a sentence fragment, the SPO may be extracted with their properties. In this regard, properties may be described as attributes of either subject or object specified in a requirement sentence, with verbs being removed. For example, in the case of "customer's name" or "name of customer", customer may be either subject or object, and name may be an attribute of customer.

With respect to SPO extraction, passive verbs may be identified and interchanged with subject and object. For example, in the case of an active voice, subject performs the action denoted by the verb. However, in case of a passive voice, word order may change, and subject in active voice may become object in passive voice, and vice versa. SPO extraction may need to consider the type of voice present in a sentence, and extract subject and object accordingly. SPO extraction may also include identifying whether a sentence is negative. For example, a negative verb may indicate a certain action is not allowed to be perform. Negation presence in a requirement sentence may be used to validate whether the same action is allowed as per a functional model, or not, and vice versa.

With respect to rule property extraction, rule properties may represent attributes mentioned in a rule fragment, and depending on a sentence structure, rule properties may represent other information such as a comparison operator, existential phrase, or change phrase, etc. In order to map rule fragments to rules in a domain, rule properties may be extracted from a sentence fragment. A rule fragment may be described as a simple sentence without any conjunctions, such as "or" and "and". A rule mentioned in a requirement sentence may include conjunctions. Phrase simplification as described herein may be used to simplify a sentence by removing conjunctions, and forming simple sentences. Further, a domain may be described as an instantiated meta model. The sentence classifier 140 may identify a rule property as a comparison where different attributes are compared, identify the comparison operator, and whether the comparison operator is negated. For example, with respect to "not greater than", negation may be used to indicate that this is not allowed. For example, for a sentence that indicates "if the number of years NCD is not greater than the number of years driving license held," the rule properties may include "number of years NCD", "number of years driving license held", "greater than", and "not". In this regard, rule property extraction may be used to create the rule context 110. With respect to the identification of a rule property as a comparison, comparison phrases may include, for example, greater than or equal to, less than or equal to, greater than, less than, equal, or equals, etc.

The sentence classifier 140 may identify a rule property as a logical value where an attribute is true or false. With respect to the logical value rule property, based on the type of rule, the sentence structure may change, and hence the appropriate heuristics may be used to parse different types of sentences and extract relevant properties. The rule properties may include the attribute, the logical value, and whether the logical value is negated or not. For example, for a sentence that indicates "if previous insurance is true on declarations object for the quote then," the rule properties may include "previous insurance" and "true" as the main properties, and "declaration object" and "quote" as other properties.

The sentence classifier 140 may identify a rule property as an attribute existence and determine the main property, the existential phrase, if the existential phrase is negated, and the other nouns in the sentence fragment. With respect to the attribute existence rule property, based on the type of rule, the sentence structure may change, and hence the appropriate heuristics may be used to parse different types of sentences, and extract relevant properties. For example, for a sentence that indicates "if the vehicle record exists for the quote," the rule properties may include "vehicle record", "exists", and not negated as the main properties, and "quote" as other properties.

The sentence classifier 140 may identify a rule property as an attribute change to locate the main property, the change phrase, if the change phrase is negated, and other nouns in the sentence fragment. With respect to the attribute change rule property, based on the type of rule, the sentence structure may change, and hence the appropriate heuristics may be used to parse different types of sentences, and extract relevant properties. For example, for a sentence that indicates "if any rating related information is changed on the quote then," the rule properties may include "rating related information", "changed" and not negated as the main properties, and "quote" as the other properties.

The sentence classifier 140 may identify a rule property as an attribute type to locate the main properties, the verb, and if the phrase is negated. With respect to the attribute type rule property, based on the type of rule, the sentence structure may change, and hence the appropriate heuristics may be used to parse different types of sentences, and extract relevant properties. For example, for a sentence that indicates "if the additional driver is a student," the rule properties may include "additional driver", "student" and "is".

The sentence classifier 140 may identify a rule property as a dependent action that is performed by using SPO extraction to map to a task in the domain and not a rule. In a functional model, a dependent action may be captured as one task depends on another task with sequence of execution. This sequence and task signature (SPO) may be used to validate the requirement. For example, a dependent action may include a sentence that indicates "when the customer finishes updating the vehicle details."

The sentence classifier 140 may map the main property, or the first and second property of a rule to a domain attribute. Based on the type of rule, the rule may include one or two properties called first or second property.

With respect to rule matching to domain rules (i.e., rules defined in an instantiated model), once the rule properties are mapped to domain attributes and operators, a dlquery (i.e., query language to search classified ontology) may be used to identify the matching domain rule. For example: "LogicalValueRule and hasDependentAttribute value PreviousInsurance and hasBooleanValue value true" is a DL query that returns all LogicalValueRules from a functional model whose hasDependentAttribute value is PreviousInsurance, and hasBooleanValue is true.

The sentence classifier 140 may map the SPO to domain entities (i.e., entities in a functional model) and actions. For example, a functional model may include entities and tasks that are defined using entities and action. The sentence classifier 140 may map entities and action extracted from a sentence to entities and action defined in a functional model with a confidence score.

With respect to sentence classification, in addition to entity mapping, domain tasks (i.e., tasks defined in a functional model) may be used for entity mapping. For example if an object is not located, the functional model repository 116 may be queried for tasks with the mapped subject and predicate, and the objects in resulting tasks may be considered as suggestions. If the intersection of the list of suggestions using JACCARD index and the suggestions from domain tasks includes one element, the element may be considered as the object, if more than one element is there, then the list of suggestions is the suggestion, and if no element is returned, then the union of the lists is the suggestion. The matching process may depend on a natural language processor's output, and it may include inaccuracies. Therefore, the sentence may be mapped to multiple tasks in a functional model instead of one, and the result of a query may be used as suggestions to a user.

The sentence classifier 140 may perform predicate mapping by using a key value map in a properties file. A predicate may be an action defined in the functional model. For certain actions, the equivalent action may be defined in a file so that a user may add additional mappings if required. For example, equivalent of choose is elect.

After an SPO extraction and mapping of the SPO to domain entities successfully, the sentence classifier 140 may map, entities and action extracted from sentence to entities and action in a functional model, to a domain task using DL query. DL query may be used to query a functional model to retrieve tasks with mapped subject, object, and predicate. For example: "task and hassubject value customer and has function value enter and has associated entity value vehicle". This query will retrieve all tasks from a functional model whose subject is customer, action is enter, and object is vehicle.

Based on the classification of the sentence (or sentence fragment) as a task or as a rule, the task context 108 or the rule context 110 may be respectively determined. With respect to the task context 108, the task context 108 may represent the specifics of the subject, action, and/or object (i.e., term on which action is taken) for the task. As described herein with reference to FIG. 3, a task may be defined with subject, object, action and other involved entities. The rule context 110 may represent the specific type of rule. For example, the rule context 110 may classify the rule as an attribute comparison rule (e.g., attribute A versus attribute B), a mathematical rule (e.g., age is greater than a specified value), etc.

The ontology and database query analyzer 146 (which includes a similar instance in the process context analyzer 118) of the requirements context analyzer 106 may query the functional model repository 116 with respect to the task context 108 and/or the rule context 110. The ontology and database query analyzer 146 may identify the functional model 148 that is that is related to the requirements document 112 from the functional model repository 116. With respect to identification of the functional model that is related to the requirements document 112, a user may provide information about a relevant functional model for which requirements are written. The related functional model 148, which includes the related tasks, rules, and entities, may be forwarded to the process extractor 128, task selector 130, entity selector 132, rules selector 134, and dependent functional use-case selector 124 to generate the intermediate functional use-case model 150 (e.g., an intermediate XML model for the functional use-case 120), and forward the intermediate functional use-case model 150 to the document generator 136. With respect to the related functional model 148, the process context analyzer 118 may include information about a related function model that will be transformed to the intermediate functional use-case model 150. The document generator 136 may utilize the functional use-case template 138 to generate the functional use-case 120. The functional use-case 120 that is generated may be stored in the functional use-case repository 126.

Figure 2:
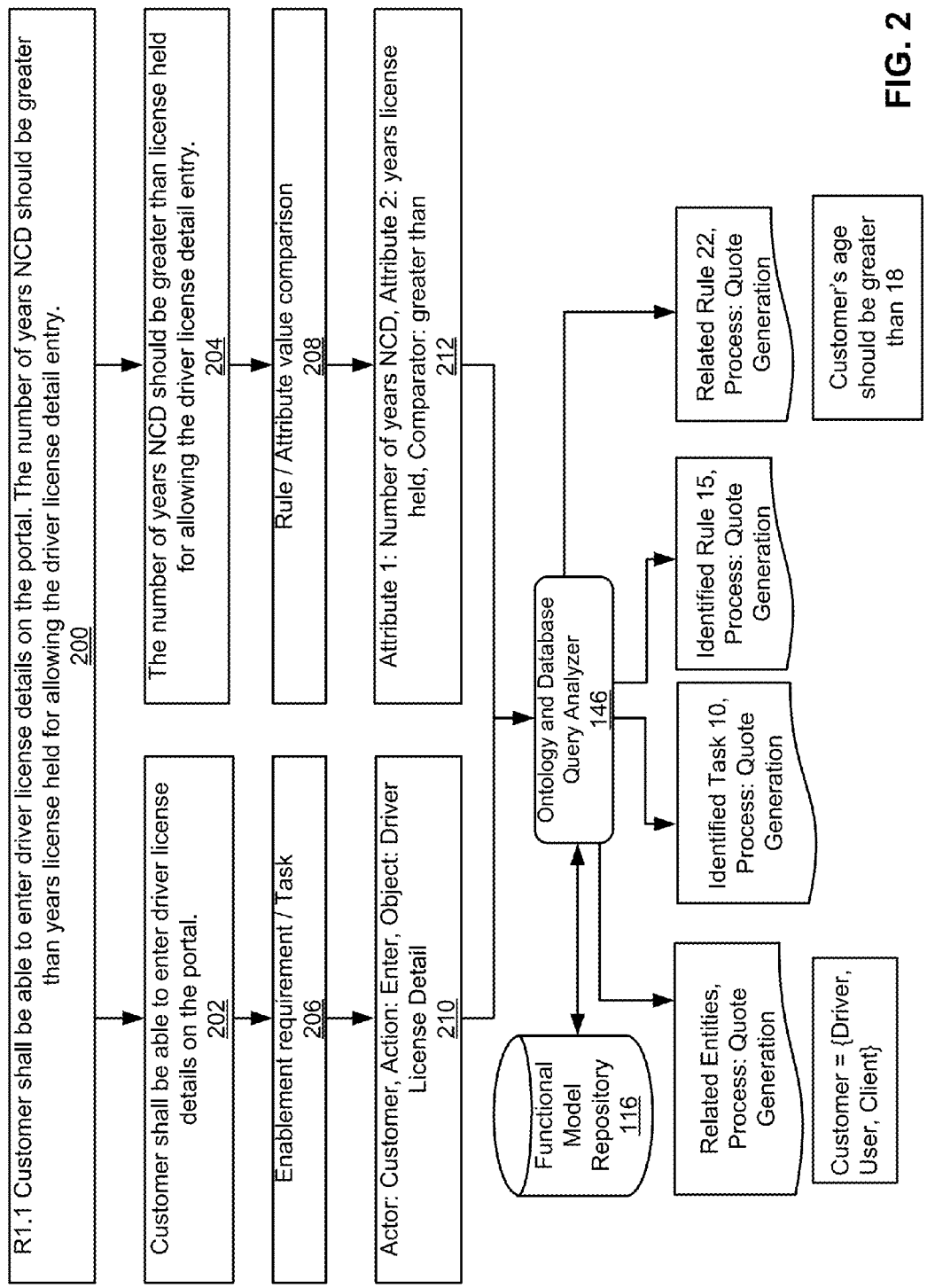
FIG. 2 illustrates requirements context determination for the functional use-case generation system, according to an example of the present disclosure.

FIG. 2 illustrates requirements context determination for the system 100, according to an example of the present disclosure. At 200, a requirements document 112 may include the requirement "Customer shall be able to enter driver license details on the portal. The number of years NCD should be greater than years license held for allowing the driver license detail entry."

The sentence classifier 140 may fragment the requirements for the requirements document 112 into a first sentence fragment ("Customer shall be able to enter driver license details on the portal") at 202, and a second sentence fragment ("The number of years NCD should be greater than years license held for allowing the driver license detail entry") at 204.

The sentence classifier 140 may classify each sentence fragment of the sentence as a task or as a rule. If the sentence fragment is classified as a task, then the entity extractor 142 may determine the entity for the task. If the sentence fragment is classified as a rule, then the constraint extractor 144 may determine the attributes of the rule. For example, at 206, the first sentence fragment at 202 may be classified as a task. Further, at 208, the second sentence fragment at 204 may be classified as a rule.

Based on the classification of the sentence fragments as a task or as a rule, the task context 108 or the rule context 110 may be respectively determined. At 210, with respect to the task context 108, the task context 108 may represent the specifics of the entity, action, and/or object for the task. For example, for the task context 108, the entity may be "customer", the action may be "enter", and the object may be "driver license detail".

At 212, the rule context 110 may represent the specifics of the type of rule. For example, the rule context 110 may classify the rule as an attribute comparison rule, where a first attribute is "number of years NCD", a second attribute is "years license held", and a comparator is "greater than".

The ontology and database query analyzer 146 of the requirements context analyzer 106 may query the functional model repository 116 with respect to the task context 108 and the rule context 110, respectively at 210 and 212. The ontology and database query analyzer 146 may identify the related functional model 148 from the functional model repository 116. With respect to identification of the related functional model 148, a user may provide information about a relevant functional model for which requirements are written. The related functional model 148, which includes the related tasks, rules, and entities, may be forwarded to the process extractor 128, task selector 130, entity selector 132, rules selector 134, and dependent functional use-case selector 124 to generate the intermediate functional use-case model 150. In this example, the process scope is for Quote Generation For example, the ontology and database query analyzer 146 may identify the tasks for the first sentence fragment at 202 as task 10, which includes the process of quote generation, and the rules for the second sentence fragment at 204 as rule 15, which also includes the process of quote generation. The identified tasks and rules may respectively represent tasks and rules that match existing tasks and rules for the functional model 148 from the functional model repository 116.

Further, the ontology and database query analyzer 146 may identify the entities that are related to the first sentence fragment at 202 as customers that include drivers, users, and clients, and the rules that are related to the second sentence fragment at 204 as rule 22 (e.g., "a customer's age should be greater than eighteen"). The related tasks and rules may respectively represent tasks and rules that map to identified tasks and rules for the functional model 148 from the functional model repository 116. The related entities may be determined, for example, based on an entity model in the functional use-case repository 126 that indicates that entities such as drivers, users, and clients are related to customers (for the example of FIG. 2). The entity model may be based on aspects such as the name of the entity, the type of the entity, and synonyms related to the entity. The related rules may be determined, for example, based on a rule model that specifies relationships between rules and tasks. For example, a task may include no related rules, or a plurality of related rules. For the example of FIG. 2, the rule 22 may be related to the identified task 10 and/or the rule 15. With respect to determination of related entities, related rules, entity model, and rule model, the determination may be performed as described herein with reference to FIG. 3.

Figure 3:
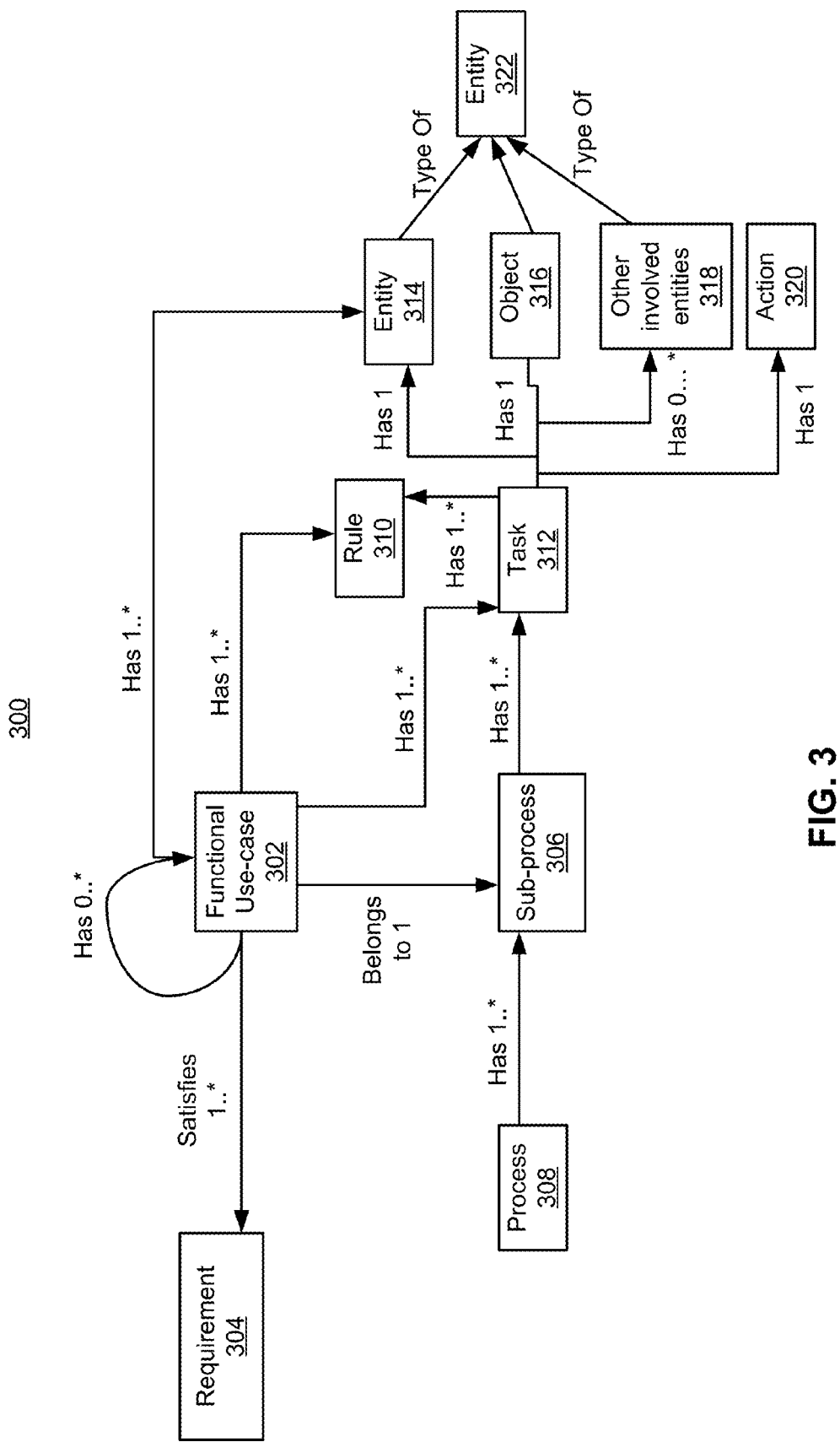
FIG. 3 illustrates a high-level model for the functional use-case generation system, according to an example of the present disclosure.

FIG. 3 illustrates a high-level model 300 for the system 100, according to an example of the present disclosure. The model 300 may be used to generate a model for the ontology and database query analyzer 146 and/or a model for the functional model repository 116. For example, starting at the functional use-case at 302, once the functional use-case satisfies one or more requirements at 304, the functional use-case may include zero or more dependent functional use-cases. The functional use-case may belong to one sub-process at 306, where a process may be decomposed into two or more sub processes, and a sub-process may define a finer grained functionality. A process and sub-process may define a process context 122. With respect to the sub-process at 306, a process at 308 may include one or more of the sub-processes at 306. The linkage between the functional use-case at 302 and the sub-process at 306, which is linked to the process at 308, thus links the functional use-case at 302 to the process at 308. The functional use-case at 302 may include one or more rules at 310 and one or more tasks at 312. A task at 312 may include an entity at 314, an object at 316, zero or more other involved entities at 318, and an action at 320. The task at 312 may include one or more rules at 310. The functional use-case at 302 may also include one or more entities at 314. The entity at 314, object at 316, and other involved entities at 318 may be a type of entity at 322, where the entity at 314 and at 322 are conceptually similar, and the entity at 322 may be used to indicate a hierarchical relation between the entity at 314, the object at 316, and other involved entities at 318.

For the high-level model 300 for the system 100, a model for the functional model repository 116 may be generated based on the process at 308, the sub-process at 306, the rule at 310, the task at 312, the entity at 314, the object at 316, the other involved entities at 318, the action at 320, and the entity at 322. The functional model repository 116 may include files of individual functional models, where each functional model may be an instantiation of the high-level model 300. A model for the functional use-case 120 may be generated based on the functional use-case at 302. The functional use-case 120 may be a verbose description based on the model elements in and related to the functional use-case at 302. Further, a requirements model may be generated based on the requirements at 304. The relation between the functional use-case at 302 and the requirements at 304 is a traceability link and a requirements model is not generated.

Figure 4:
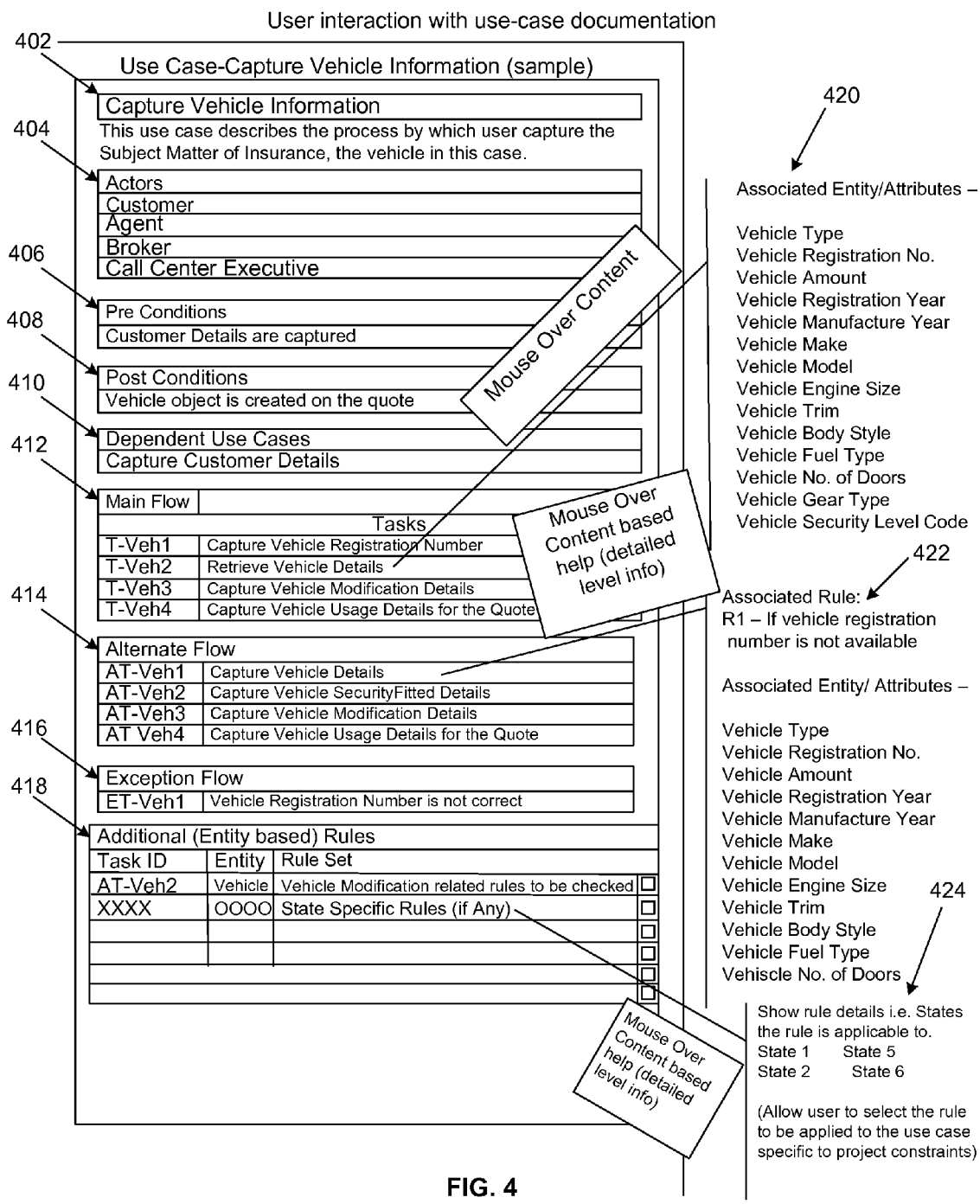
FIG. 4 illustrates user interaction with a functional use-case for the functional use-case generation system, according to an example of the present disclosure.

FIG. 4 illustrates user interaction with a functional use-case 120 for the system 100, according to an example of the present disclosure. For example, referring to FIG. 4, an HyperText Markup Language (HTML) functional use-case 120 related to capture of vehicle information may include a description of the functional use-case 120 at 402, actors specified at 404, pre-conditions at 406, post conditions at 408, dependent functional use-cases specified at 410, main flow at 412, alternate flow at 414, exception flow at 416, and additional (entity based) rules at 418. The pre-conditions at 406 may represent conditions that must always be true just prior to the execution of a functional use-case. The post conditions at 408 may represent conditions that must always be true just after the execution of a functional use-case. The main flow at 412 may represent an unconditional set of steps that describe how a functional use-case goal may be achieved, and how all related stakeholder interests can be satisfied. The alternate flow at 414 may represent a conditional set of steps that are an alternative to one or more steps in another flow (the alternative flow is performed instead of the other step or steps), after which the functional use-case continues to pursue its goal. The exception flow at 416 may represent a conditional set of steps that are a response to the failure of a step in another flow (the exception flow is performed after the other step), after which the functional use-case abandons the pursuit of its goal. The additional (entity based) rules at 418 may represent rules which are not captured in a functional model, but are instead captured while generating a functional use-case. Based on a selection of any of the aspects of the functional use-case 120, additional related elements may be displayed. For example, based on a selection of "Retrieve Vehicle Details" in the main flow 412, associated entity and attributes may be displayed at 420. Further, based on a selection of "Capture Vehicle Details" in the alternate flow 414, associated rules, and associated entity and attributes may be displayed at 422. Similarly, based on a selection of "state specific rules (if Any)" in the additional (entity based) rules at 418, associated rule details may be displayed at 424. The associated information at 420, 422, and 424 may represent additional knowledge with respect to a functional use-case. The associated information at 420, 422, and 424 may represent additional knowledge retrieved from the functional model pertaining to an element selected by the user. For example, the associated information at 420 may pertain to selected entity, the associated information at 422 may pertain to selected task, and the associated information at 424 may pertain to selected rule in use case.

Figure 5A:
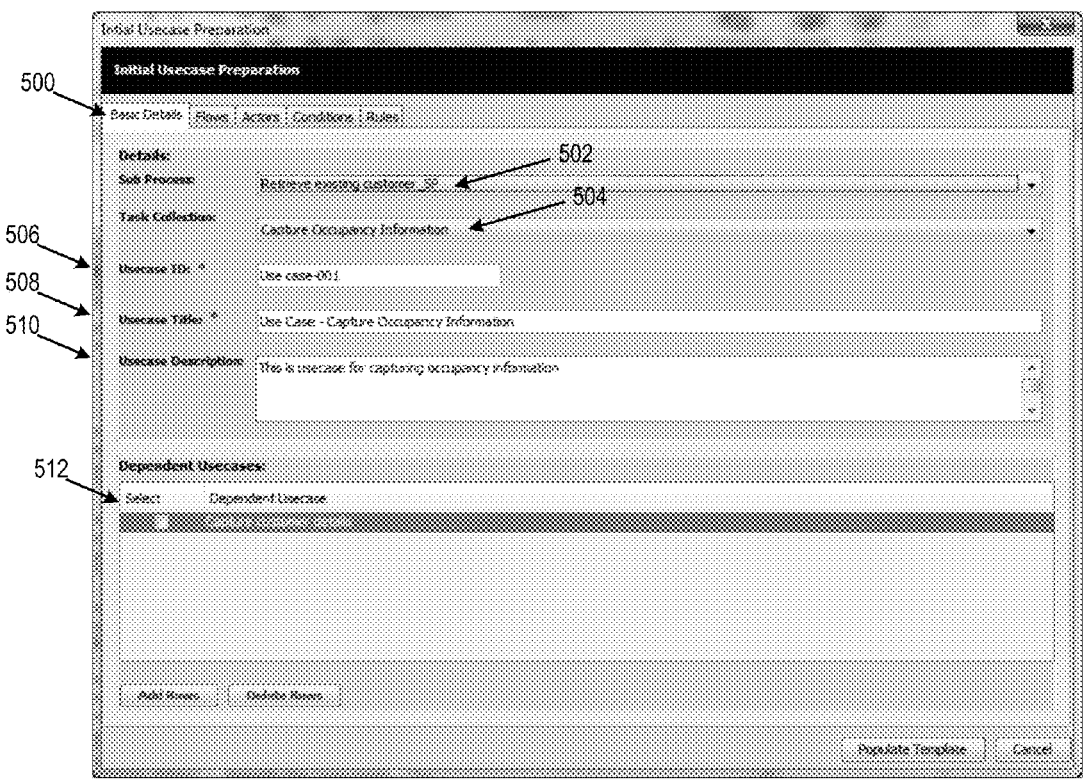
FIG. 5A illustrates a tabbed graphical user interface (GUI) for a process context analyzer 118 of the functional use-case generation system, according to an example of the present disclosure.

FIG. 5A illustrates a tabbed GUI for the process context analyzer 118, according to an example of the present disclosure. Referring to FIG. 5A, as described herein with reference to FIG. 3, at 500, a process may be scoped based on the selection of an existing sub-process at 502. The sub-process may include one or more tasks, which may be populated and selected at 504. The task collection 504 may list all of the tasks in a particular sub-process. The functional use-case identification (ID), title, and description may be respectively entered at 506, 508, and 510. The dependent functional use-cases at 512 may be determined from the functional use-case repository 126.

Figure 5B:
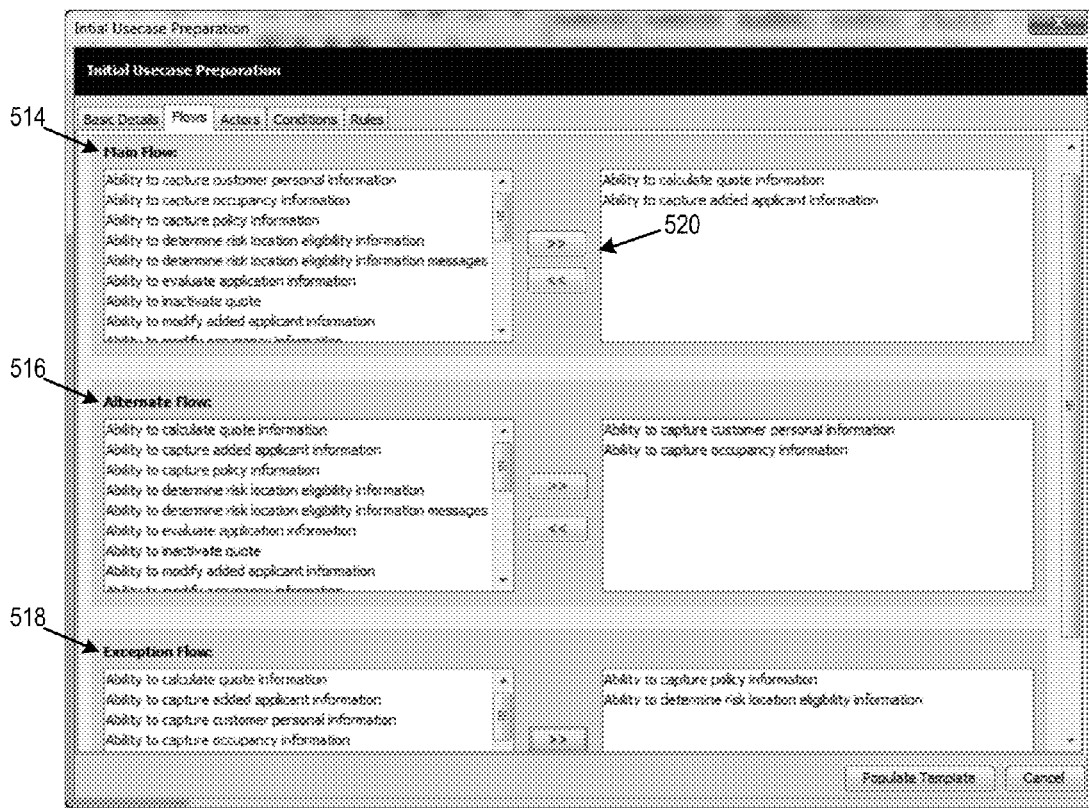
FIG. 5B illustrates defining of flows using the tabbed GUI for the process context analyzer, according to an example of the present disclosure.

FIG. 5B illustrates defining of flows using the tabbed GUI for the process context analyzer 118, according to an example of the present disclosure. For the flows illustrated in FIG. 5B, the main flow at 514 may include a list of all of the steps that may be selected for a particular functional use-case. The alternate flow at 516 may include a list of all of the steps that may be selected for a particular functional use-case in the event a rule is modified and/or invalidated. With respect to modification and invalidation of a rule, the system 100 may capture added applicant information. Alternatively or additionally, if the system 100 does not capture added applicant information, the system 100 may go to the alternate flow at 516 and capture occupancy information. Alternatively or additionally, if the system 100 does not go to the alternate flow at 516 and capture occupancy information, the system 100 may refine the information by capturing the policy information as an exception flow. The exception flow at 518 may include a list of all of the steps that may be selected for a particular functional use-case in the event of a failure scenario. The steps for the main flow at 514, the alternate flow at 516, or the exception flow at 518 may be selected by using the selection tabs at 520.

Figure 5C:
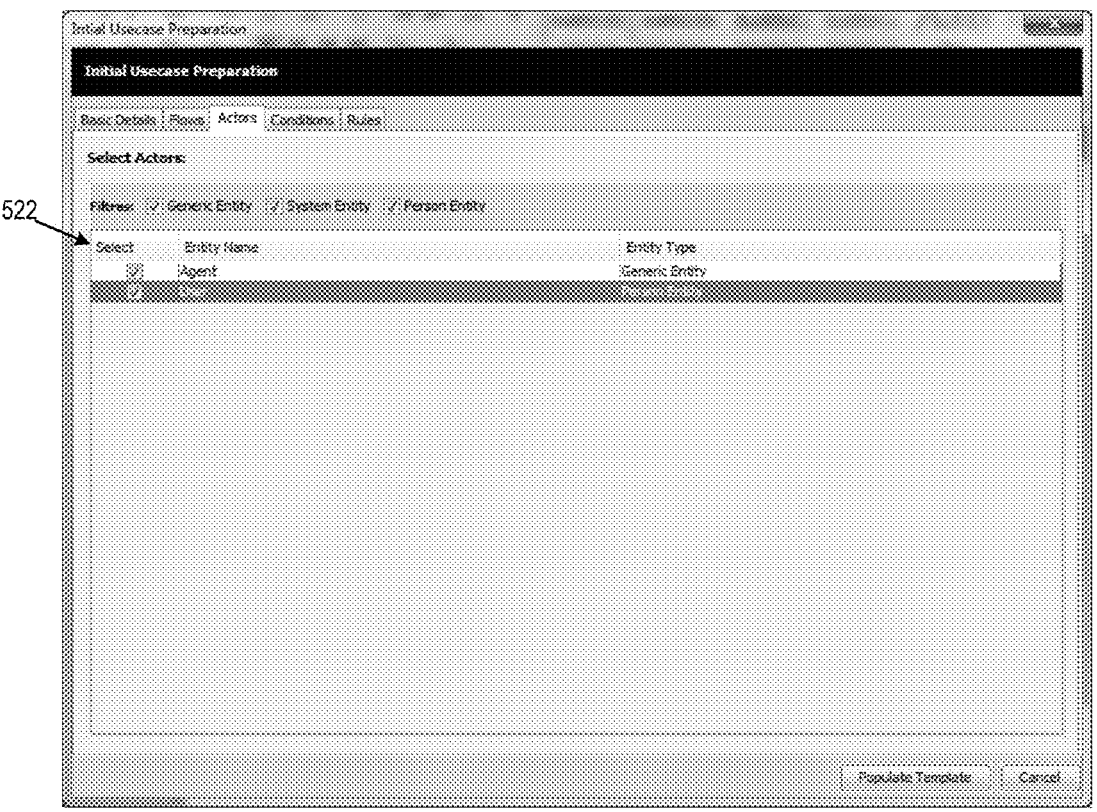
FIG. 5C illustrates selection of actors using the tabbed GUI for the process context analyzer, according to an example of the present disclosure.

FIG. 5C illustrates selection of actors using the tabbed GUI for the process context analyzer 118, according to an example of the present disclosure. The actors listed at 522 may represent that actors that have participated in the tasks that are selected with respect to the main flow at 514, the alternate flow at 516, or the exception flow at 518.

Figure 5D:
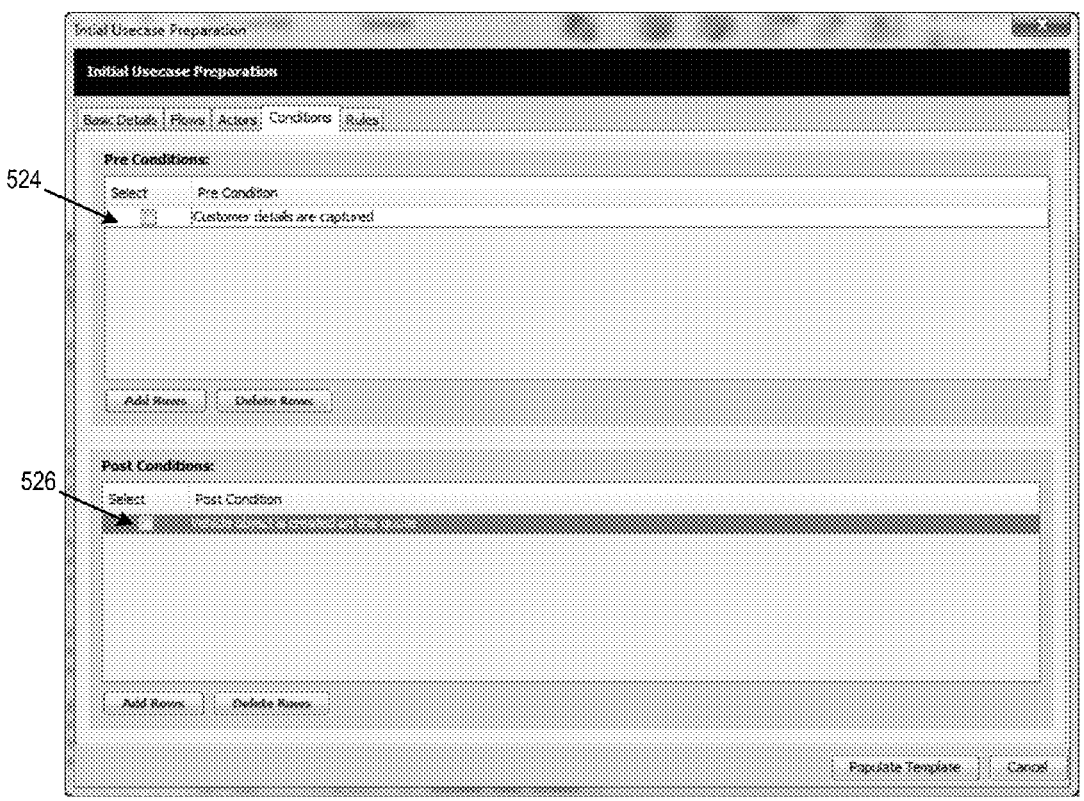
FIG. 5D illustrates capturing of pre-conditions and post-conditions using the tabbed GUI for the process context analyzer, according to an example of the present disclosure.

FIG. 5D illustrates capturing of pre-conditions and post-conditions using the tabbed GUI for the process context analyzer 118, according to an example of the present disclosure. With respect to determination of the pre-conditions and post-conditions, if the current use case has dependency on some other use case, then pre-conditions and post-conditions defined in a dependent use case may appear in FIG. 5D. Otherwise a user may input the pre-conditions and post-conditions by selecting an "Add Row" option in FIG. 5D. Further, the pre-conditions and post-conditions may be determined from the functional use-case repository 126, and added by selection at 524 and 526, respectively. The pre-conditions may represent a state of a system that is related to the functional use-case 120 before execution of the functional use-case 120, and the post-conditions may represent a state of the system after execution of the functional use-case 120.

Figure 5E:
FIG. 5E illustrates capturing of rules using the tabbed GUI for the process context analyzer 118, according to an example of the present disclosure.

FIG. 5E illustrates capturing of rules using the tabbed GUI for the process context analyzer 118, according to an example of the present disclosure. For example, referring to FIG. 5E, rules that are applicable for the functional use-case 120 may be selected at 528. The rules may be added from the functional use-case repository 126 at 530, custom rules may be added at 532, and rules may be deleted at 534. The functional use-case 120 may be generated based on selection of the populate template option at 536.

FIGS. 6A-6H illustrate various components of a functional model, according to an example of the present disclosure. For the example of FIGS. 6A-6H, the components of the functional model may include a logical operating model as shown in FIG. 6A, type of function in FIG. 6B, functional area in FIG. 6C, processes in FIG. 6D, areas in FIG. 6E, sub-processes in FIG. 6F, entity details in FIG. 6G, and task details in FIG. 6H. The examples of FIGS. 6A-6H may represent partial views of a functional model. In FIGS. 6A-6D and 6F, the process repository related to the process repository reference ID and the process repository reference uniform resource locator (URL) may include process information such as textual descriptions, process key performance indicators, maturity assessment framework, etc., where the specific functional aspects of a process (e.g., tasks, rules, entities, process hierarchy, etc.), may be stored in the functional model repository 116. The functional model repository 116 may link the process hierarchy to the appropriate section in the process repository, so that additional information available in the process repository may be reviewed if needed to comprehend a domain.

Figure 7:
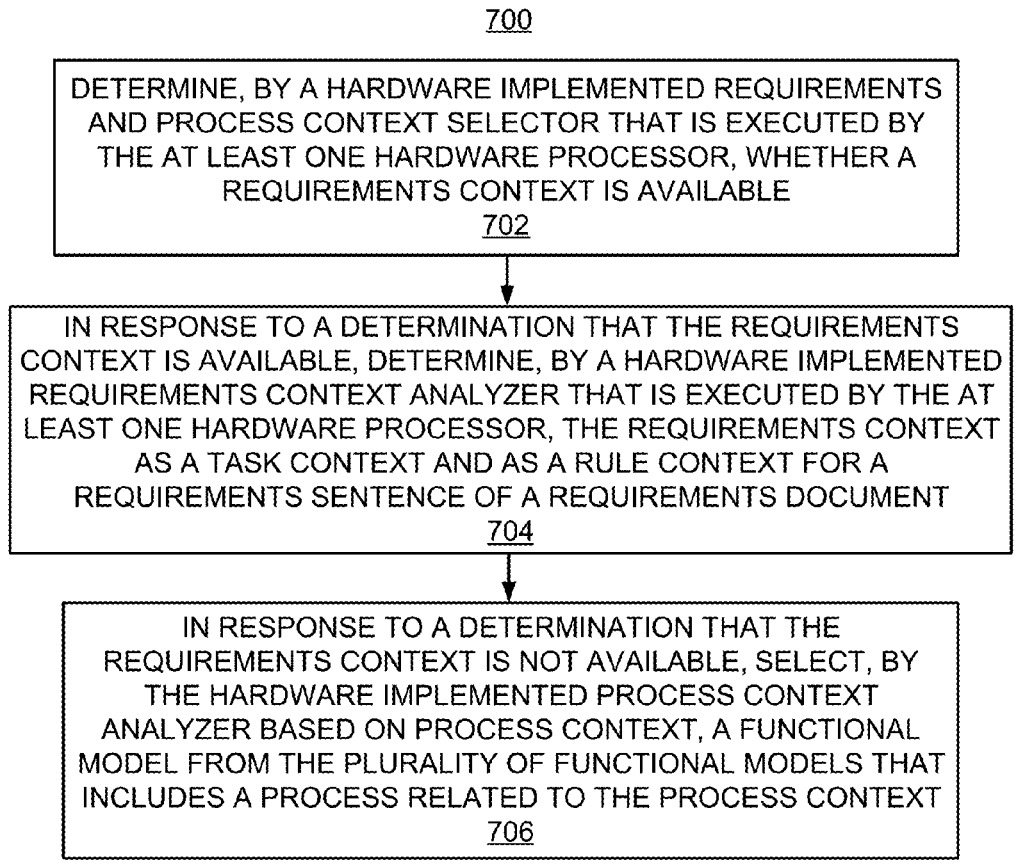
FIG. 7 illustrates a method for functional use-case generation, according to an example of the present disclosure.
Figure 8:
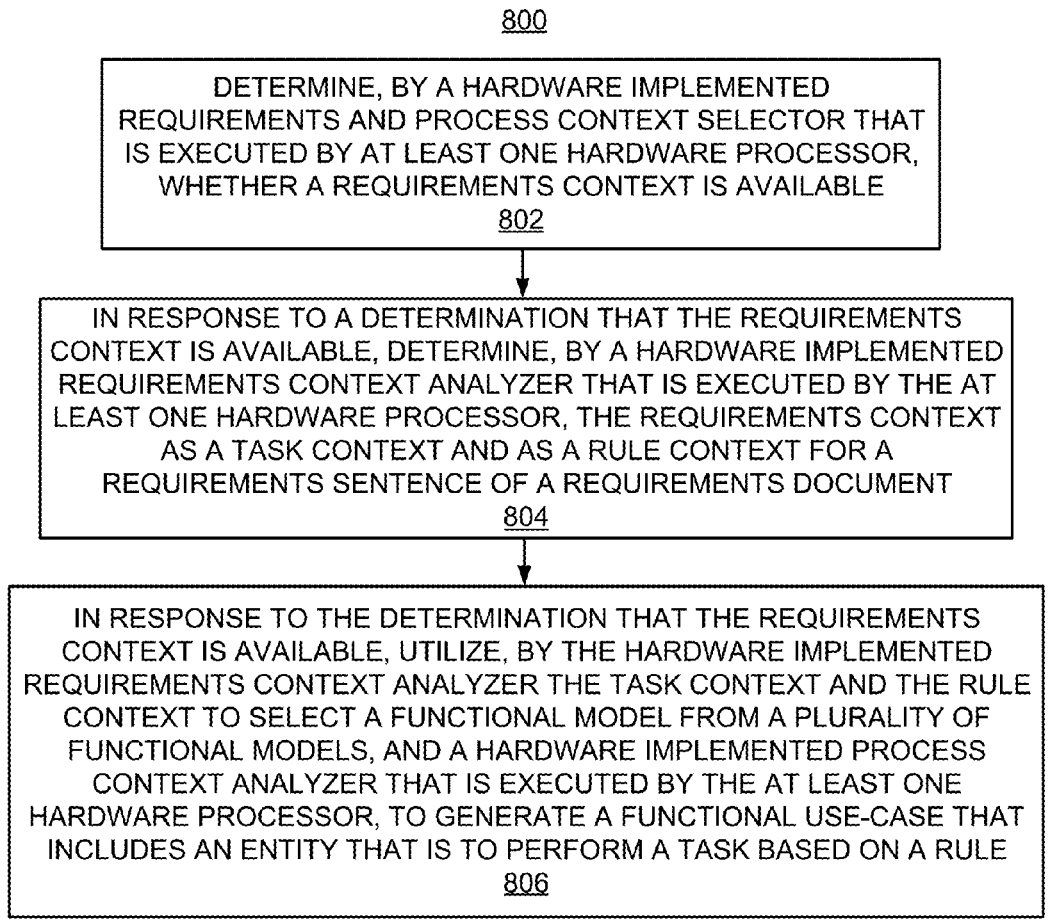
FIG. 8 illustrates further details of the method for functional use-case generation, according to an example of the present disclosure.

FIGS. 7 and 8 illustrate flowcharts of methods 700 and 800 for functional use-case generation, according to examples. The methods 700 and 800 may be implemented on the functional use-case generation system 100 described above with reference to FIGS. 1-6H by way of example and not limitation. The methods 700 and 800 may be practiced in other systems.

Referring to FIGS. 1-7, at block 702, the method 700 may include determining, by the hardware implemented requirements and process context selector 102 that is executed by at least one hardware processor, whether the requirements context 104 is available.

Referring to FIGS. 1-7, at block 704, in response to a determination that the requirements context 104 is available, the method 700 may include determining by the hardware implemented requirements context analyzer 106 that is executed by the at least one hardware processor, the requirements context 104 as a task context 108 and as a rule context 110 for a requirements sentence of a requirements document 112. The method 700 may further include utilizing the task context 108 and the rule context 110 to select a functional model from a plurality of functional models 114. The functional models 114 may be based on entities, tasks, and rules. The method 700 may further include utilizing the hardware implemented process context analyzer 118 that is executed by the at least one hardware processor, to generate a functional use-case 120 that may include an entity that is to perform a task based on a rule.

Referring to FIGS. 1-7, at block 706, in response to a determination that the requirements context 104 is not available, the method 700 may include selecting, by the hardware implemented process context analyzer 118, based on process context 122, a functional model from the plurality of functional models 114 that may include a process related to the process context 122. The method 700 may further include utilizing the functional model that may include the process related to the process context 122 to generate the functional use-case 120.

According to an example, the method 700 may further include selecting, by the hardware implemented dependent functional use-case selector 124 that is executed by the at least one hardware processor, a functional use-case 120 from a plurality of functional use-cases, and using information from the selected functional use-case 120 to augment the entity, the task, and/or the rule related to the functional use-case 120 that is to be generated.

According to an example, the method 700 may further include determining, by the hardware implemented process extractor 128 that is executed by the at least one hardware processor, a process scope of the process context 122, and utilize the process scope to determine the functional model from the plurality of functional models 114 that may include the process related to the process context 122.

According to an example, the method 700 may further include selecting, by the hardware implemented task selector 130 that is executed by the at least one hardware processor, tasks based on the process scope to generate the functional use-case 120.

According to an example, the method 700 may further include selecting, by the hardware implemented entity selector 132 that is executed by the at least one hardware processor, entities based on the selected tasks to generate the functional use-case 120, and selecting, by the hardware implemented rules selector 134 that is executed by the at least one hardware processor, rules based on the selected tasks to generate the functional use-case 120.

According to an example, the method 700 may further include generating, by the hardware implemented document generator 136 that is executed by the at least one hardware processor, the functional use-case 120 based on a functional use-case template 138.

According to an example, the method 700 may further include utilizing, by the hardware implemented requirements context analyzer 106, the hardware implemented sentence classifier 140 that is executed by the at least one hardware processor, to classify the requirements sentence as a task or as a rule, and determining the task context 108 and the rule context 110 based on the classification of the requirements sentence as the task or as the rule.

According to an example, for a sentence classified as the task, the method 700 may further include utilizing, by the hardware implemented requirements context analyzer 106, the hardware implemented entity extractor 142 that is executed by the at least one hardware processor, to determine the entity related to the task, and for the sentence classified as the rule, utilizing, by the hardware implemented requirements context analyzer 106, the hardware implemented constraint extractor 144 that is executed by the at least one hardware processor, to determine an attribute related to the rule.

According to an example, the method 700 may further include utilizing, by the hardware implemented requirements context analyzer 106, the hardware implemented sentence classifier 140 that is executed by the at least one hardware processor, to perform subject, predicate, and object extraction for mapping of the requirements sentence to a task of the functional model for selection of the functional model from the plurality of functional models 114.

According to an example, utilizing the hardware implemented sentence classifier 140 to perform subject, predicate, and object extraction for mapping of the requirements sentence to the task of the functional model for selection of the functional model from the plurality of functional models 114 may further include interchanging a passive verb of the requirements sentence with a subject and/or an object of the requirements sentence.

According to an example, the method 700 may further include utilizing, by the hardware implemented requirements context analyzer 106, the hardware implemented ontology and database query analyzer 146 that is executed by the at least one hardware processor, the task context 108 and the rule context 110 to determine related entities and rules to generate the functional use-case 120.

Referring to FIGS. 1-6H and 8, at block 802, the method 800 may include determining, by the hardware implemented requirements and process context selector 102 that is executed by at least one hardware processor, whether the requirements context 104 is available.

Referring to FIGS. 1-6H and 8, at block 804, in response to a determination that the requirements context 104 is available, the method 800 may include determining, by the hardware implemented requirements context analyzer 106 that is executed by the at least one hardware processor, the requirements context 104 as a task context 108 and as a rule context 110 for a requirements sentence of a requirements document 112.

Referring to FIGS. 1-6H and 8, at block 806, in response to the determination that the requirements context 104 is available, the method 800 may include utilizing, by the hardware implemented requirements context analyzer 106 the task context 108 and the rule context 110 to select a functional model from a plurality of functional models 114, and the hardware implemented process context analyzer 118 that is executed by the at least one hardware processor, to generate a functional use-case 120 that may include an entity that is to perform a task based on a rule.

According to an example, a method for functional use-case generation may include determining, by the hardware implemented requirements and process context selector 102 that is executed by at least one hardware processor, whether a requirements context 104 is available. In response to a determination that the requirements context 104 is not available, the method may include selecting, by the hardware implemented process context analyzer 118 that is executed by the at least one hardware processor, based on process context 122, a functional model from a plurality of functional models 114 that may include a process related to the process context 122. In response to the determination that the requirements context 104 is not available, the method may include utilizing, by the hardware implemented process context analyzer 118, the functional model that may include the process related to the process context 122 to generate a functional use-case 120.

Figure 9:
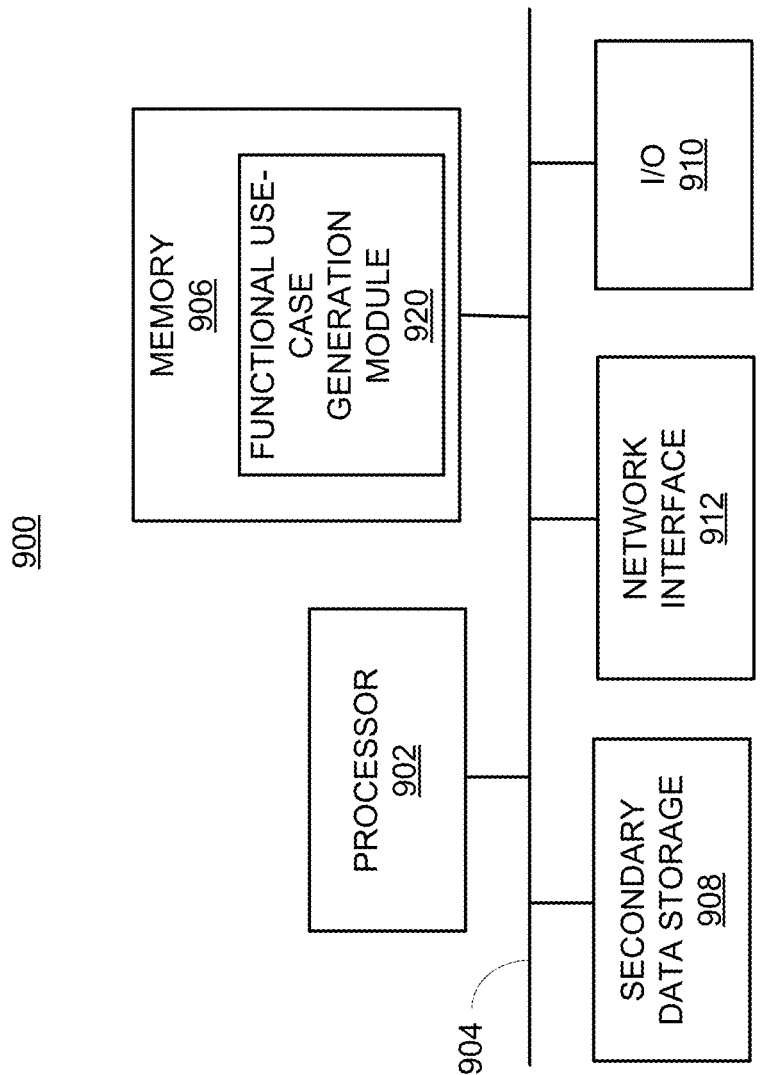
FIG. 9 illustrates a computer system, according to an example of the present disclosure.

FIG. 9 shows a computer system 900 that may be used with the examples described herein. The computer system may represent a generic platform that includes components that may be in a server or another computer system. The computer system 900 may be used as a platform for the system 100. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include a functional use-case generation module 920 including machine readable instructions residing in the memory 906 during runtime and executed by the processor 902. The functional use-case generation module 920 may include the elements of the system 100 shown in FIG. 1.

The computer system 900 may include an I/O device 910, such as a keyboard, a mouse, a display, etc. The computer system may include a network interface 912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A functional use-case generation system comprising:
   at least one hardware processor;
   a hardware implemented requirements and process context selector, executed by the at least one hardware processor, to determine whether a requirements context is available;
   in response to a determination that the requirements context is available, a hardware implemented requirements context analyzer, executed by the at least one hardware processor, to
       determine the requirements context as a task context and as a rule context for a requirements sentence of a requirements document,
       utilize the task context and the rule context to select a functional model from a plurality of functional models, wherein the functional models are based on entities, tasks, and rules, and
       utilize a hardware implemented process context analyzer, executed by the at least one hardware processor, to generate a functional use-case that includes an entity that is to perform a task based on a rule; and
   in response to a determination that the requirements context is not available, the hardware implemented process context analyzer is to
       select, based on process context, a functional model from the plurality of functional models that includes a process related to the process context, and
       utilize the functional model that includes the process related to the process context to generate the functional use-case.

2. The functional use-case generation system according to claim 1, further comprising:
   a hardware implemented dependent functional use-case selector, executed by the at least one hardware processor, to
       select a functional use-case from a plurality of functional use-cases, and
       use information from the selected functional use-case to augment at least one of the entity, the task, and the rule related to the functional use-case that is to be generated.

3. The functional use-case generation system according to claim 1, further comprising:
   a hardware implemented process extractor, executed by the at least one hardware processor, to
       determine a process scope of the process context, and
       utilize the process scope to determine the functional model from the plurality of functional models that includes the process related to the process context.

4. The functional use-case generation system according to claim 3, further comprising:
   a hardware implemented task selector, executed by the at least one hardware processor, to select tasks based on the process scope to generate the functional use-case.

5. The functional use-case generation system according to claim 4, further comprising:
   a hardware implemented entity selector, executed by the at least one hardware processor, to select entities based on the selected tasks to generate the functional use-case; and
   a hardware implemented rules selector, executed by the at least one hardware processor, to select rules based on the selected tasks to generate the functional use-case.

6. The functional use-case generation system according to claim 1, further comprising:
   a hardware implemented document generator, executed by the at least one hardware processor, to generate the functional use-case based on a functional use-case template.

7. The functional use-case generation system according to claim 1, wherein the hardware implemented requirements context analyzer is to
   utilize a hardware implemented sentence classifier, executed by the at least one hardware processor, to classify the requirements sentence as a task or as a rule, and determine the task context and the rule context based on the classification of the requirements sentence as the task or as the rule.

8. The functional use-case generation system according to claim 7, wherein
   for a sentence classified as the task, the hardware implemented requirements context analyzer is to
       utilize a hardware implemented entity extractor, executed by the at least one hardware processor, to determine the entity related to the task, and
   for the sentence classified as the rule, the hardware implemented requirements context analyzer is to
       utilize a hardware implemented constraint extractor, executed by the at least one hardware processor, to determine an attribute related to the rule.

9. The functional use-case generation system according to claim 1, wherein the hardware implemented requirements context analyzer is to
   utilize a hardware implemented sentence classifier, executed by the at least one hardware processor, to perform subject, predicate, and object extraction for mapping of the requirements sentence to a task of the functional model for selection of the functional model from the plurality of functional models.

10. The functional use-case generation system according to claim 9, wherein utilizing the hardware implemented sentence classifier to perform subject, predicate, and object extraction for requirements sentence to the task of the functional model for selection of the functional model from the plurality of functional models further comprises:
interchanging a passive verb of the requirements sentence with at least one of a subject and an object of the requirements sentence.

11. The functional use-case generation system according to claim 1, wherein the hardware implemented requirements context analyzer is to
utilize a hardware implemented ontology and database query analyzer, executed by the at least one hardware processor, to utilize the task context and the rule context to determine related entities and rules to generate the functional use-case.

12. A method for functional use-case generation, the method comprising:
determining, by a hardware implemented requirements and process context selector that is executed by at least one hardware processor, whether a requirements context is available;
in response to a determination that the requirements context is available, determining, by a hardware implemented requirements context analyzer that is executed by the at least one hardware processor, the requirements context as a task context and as a rule context for a requirements sentence of a requirements document; and
in response to the determination that the requirements context is available, utilizing, by the hardware implemented requirements context analyzer
the task context and the rule context to select a functional model from a plurality of functional models, wherein the functional models are based on entities, tasks, and rules, and
a hardware implemented process context analyzer that is executed by the at least one hardware processor, to generate a functional use-case that includes an entity that is to perform a task based on a rule.

13. The method for functional use-case generation according to claim 12, further comprising:
in response to a determination that the requirements context is not available, selecting, by the hardware implemented process context analyzer, based on process context, a functional model from the plurality of functional models that includes a process related to the process context; and
in response to the determination that the requirements context is not available, utilizing, by the hardware implemented process context analyzer, the functional model that includes the process related to the process context to generate the functional use-case.

14. The method for functional use-case generation according to claim 12, further comprising:
selecting, by a hardware implemented dependent functional use-case selector that is executed by the at least one hardware processor, a functional use-case from a plurality of functional use-cases; and
using, by the hardware implemented dependent functional use-case selector, information from the selected functional use-case to augment at least one of the entity, the task, and the rule related to the functional use-case that is to be generated.

15. The method for functional use-case generation according to claim 13, further comprising:

determining, by a hardware implemented process extractor that is executed by the at least one hardware processor, a process scope of the process context; and
utilizing, by the hardware implemented process extractor, the process scope to determine the functional model from the plurality of functional models that includes the process related to the process context.

16. The method for functional use-case generation according to claim 15, further comprising:
selecting, by a hardware implemented task selector that is executed by the at least one hardware processor, tasks based on the process scope to generate the functional use-case.

17. The method for functional use-case generation according to claim 16, further comprising:
selecting, by a hardware implemented entity selector that is executed by the at least one hardware processor, entities based on the selected tasks to generate the functional use-case; and
selecting, by a hardware implemented rules selector that is executed by the at least one hardware processor, rules based on the selected tasks to generate the functional use-case.

18. The method for functional use-case generation according to claim 12, further comprising:
utilizing, by the hardware implemented requirements context analyzer, a hardware implemented sentence classifier that is executed by the at least one hardware processor, to classify the requirements sentence as a task or as a rule; and
determining, by the hardware implemented requirements context analyzer, the task context and the rule context based on the classification of the requirements sentence as the task or as the rule.

19. The method for functional use-case generation according to claim 18, further comprising:
for a sentence classified as the task, utilizing, by the hardware implemented requirements context analyzer, a hardware implemented entity extractor that is executed by the at least one hardware processor, to determine the entity related to the task; and
for the sentence classified as the rule, utilizing by the hardware implemented requirements context analyzer, a hardware implemented constraint extractor that is executed by the at least one hardware processor, to determine an attribute related to the rule.

20. A non-transitory computer readable medium having stored thereon machine readable instructions for functional use-case generation, the machine readable instructions when executed cause at least one hardware processor to:
determining, by a hardware implemented requirements and process context selector that is executed by at least one hardware processor, whether a requirements context is available;
in response to a determination that the requirements context is not available, selecting, by a hardware implemented process context analyzer that is executed by the at least one hardware processor, based on process context, a functional model from a plurality of functional models that includes a process related to the process context, wherein the functional models are based on entities, tasks, and rules; and
in response to the determination that the requirements context is not available, utilizing, by the hardware implemented process context analyzer, the functional model that includes the process related to the process context to generate a functional use-case.

* * * * *